Figure 4:
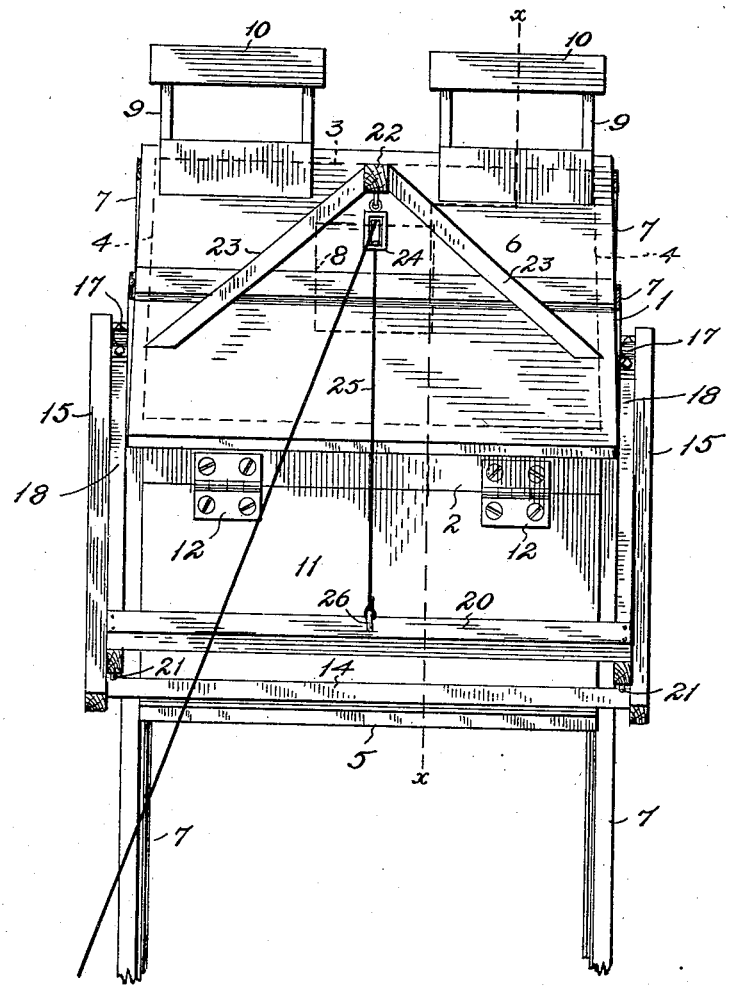

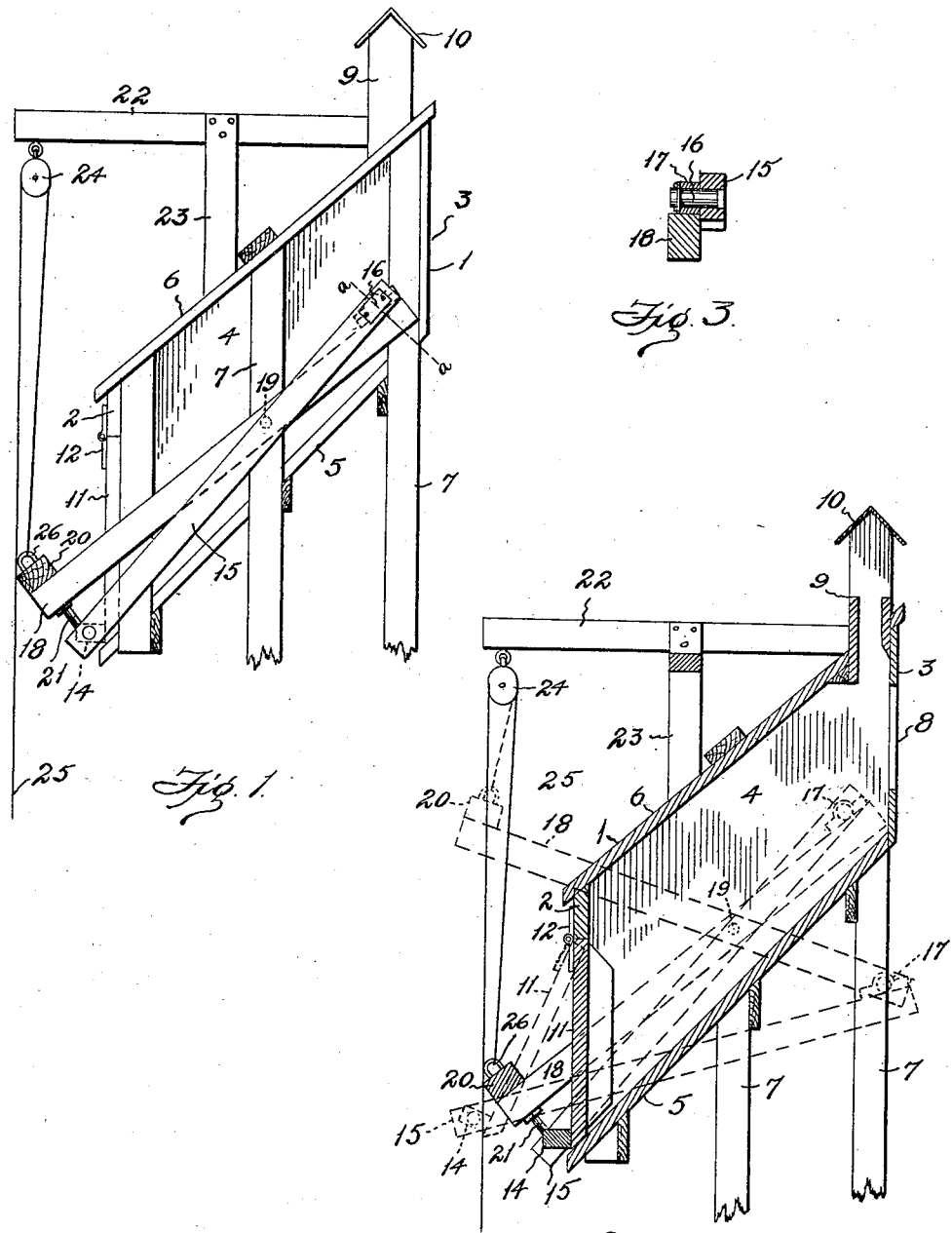

UNITED STATES PATENT OFFICE.

OSCAR W. SEVERSON, OF MABANK, TEXAS.

SEED-HOPPER.

No. 891,869.      Specification of Letters Patent.      Patented June 30, 1908.

Application filed August 8, 1907. Serial No. 387,637.

*To all whom it may concern:*

Be it known that I, OSCAR W. SEVERSON, citizen of the United States, residing at Mabank, in the county of Kaufman and State of Texas, have invented certain new and useful Improvements in Seedboxes, of which the following is a specification.

My invention relates to new and useful improvements in seed hoppers and more particularly to a cotton seed hopper.

The object of the invention is to provide a hopper constructed to efficiently receive and discharge the cotton seed.

Another feature resides in the arrangement of the door, the means for opening the same together with means for holding the door closed irrespective of the pressure of seed within the hopper.

A still further feature lies in the arrangement whereby the door is readily opened without undue exertion or the liability of seed falling on the operator.

Finally, the object of the invention is to provide a device of the character described that will be strong, durable and simple and comparatively inexpensive to produce, also one in which the several parts will not be liable to get out of working order.

With the above and other objects in view the invention has particular relation to certain novel features, an example of which is described in the specification and illustrated in the accompanying drawings, wherein:

Figure 1 is an end elevation of the hopper. Fig. 2 is a transverse, vertical sectional view taken on the line $x$—$x$ of Fig. 4 and showing in dotted lines, the door in its open position. Fig. 3 is a vertical section taken on the line $a$—$a$ of Fig. 1, and Fig. 4 is a front elevation of the hopper.

In the drawings, the numeral 1 designates the hopper which is suitably constructed, preferably of wood and provided with vertical front, rear and side walls, 2, 3, and 4, respectively. The hopper has an inclined bottom 5 extending preferably at an angle of substantially forty-five degrees. It is also provided with an inclined top or roof 6 which, however, extends at a greater angle to the rear wall 3 so as to cause the hopper to flare forward and thus increase in size. By observing Fig. 4 it will be noted that the side walls 2 diverge forwardly which cause the hopper to increase in width forwardly. As the seed is admitted at the rear of the hopper and discharged at the forward end, this forward flaring construction prevents the seed from packing and affords a ready discharge. The hopper is suitably supported upon posts 7 at the proper height to discharge into the body of a wagon, which it is used to load. It will be noted that the roof 6 projects beyond the walls of the hopper thus protecting the same from the weather.

At the middle portion of the back wall 3 an opening 8 is provided. Through this opening the cotton seed is blown from the gin in the usual manner, the seed storing in the hopper and the air passing up through a pair of flues 9 open at their upper ends and covered with metal caps 10. At the forward end of the hopper a door 11 extending across the front is supported by suitable hinges 12 fastened to the front wall 2. This door is arranged to swing outwardly and has secured along its lower end a strip 14 projecting slightly beyond the door, and having pivotal connection with the lower end of side links 15. These levers extend rearwardly and carry at their rear ends inwardly projecting pins 16 suitably secured in place and engaging boxes 17 carried on the rear ends of forwardly extending levers 18. These levers 18 pass between the links 15 and the central posts 7 being suitably pivoted to the latter, as indicated at 19. It will be noted by observing Figs. 1 and 2 that the greater portion of the levers 18 projects forward of the pivotal point. The outer ends of the levers 18 which terminate near the ends of link 15, are connected by a transverse beam 20 secured on the same, so that by swinging the beam upward, the levers 18 are swung thus swinging the door 11 outwardly through the agency of the links 15 and the connections described. Set screws 21 are carried by the strip 14 and support the ends of levers 18. By adjusting these screws the ends of the levers 18 may drop slightly lower, thus taking up the weight and permitting the door 11 to fully close.

It is obvious that the levers 18 being pivoted when their forward ends are swung downward, their rear ends are swung upward and the links 15 being connected to the levers 18 and also to the door 11 are carried rearwardly, thus closing the door and working in opposite directions when the beam 20 is swung upward to open the door. It will also be evident that when the door is closed the pressure or weight of seed within the hopper can not force the same open, as the pressure exerted is transmitted by the strip 14 to the links 15, which can not move forward until the levers 18 are swung on their pivot 19.

For swinging the beam 20 and opening the door 11 a beam 22 is supported from the roof of the hopper by braces 23. This beam at its outer end carries a pulley block 24 through which a suitable rope or other flexible connection 25 is passed. The inner end of this rope is suitably secured to a staple 26 fastened at the center of beam 20, the free end of rope hanging below the hopper so as to be grasped by the operator and carried forward by him as the wagon passes beneath the hopper, as indicated in Fig. 4. By pulling on the rope the beam 20 is swung upward and the door opened as indicated by dotted lines in Fig. 2, thus permitting the seed to discharge into the wagon body (not shown) below. When the beam is swung upward the outer ends of levers 18 are swung upward on their pivots 19 causing their rear ends to swing downward. The links 15 having pivotal connections at their rear ends with the levers 18 are swung downward and forward and being pivotally connected to the strip 14 which is carried by the door, the latter is consequently swung outward. When the rope 25 is released, the weight of the beam 23 and the levers 18 swing the parts to their normal position.

It is observed that comparatively little exertion is required to swing the beam 20 and after the operator has given the rope 25 a slight pull the weight of the seed against the door 11 will assist in the opening operation. However, until this initial pull is given, the seed can not possibly swing open the door, even though the pressure is considerable.

It will be further noted that the operator may stand at one side of the hopper so that there is no danger of the seed falling on him as the door is opened.

The seed being blown into the hopper from the gin, it is obvious that some means of escape for the air, as the flues 9, must be provided, otherwise, the air would back up in the blower and interfere with the operation of the same; also the door of the hopper would have to stand a severe strain and considerable resistance to the delivery of the seed into the hopper would be offered.

What I claim, is:

1. In combination with a hopper, a pivoted door controlling the discharge therefrom, a lever fulcrumed at one side of the hopper, and a link pivotally connecting said lever and door, the pivotal points of said link being positioned on opposite sides of the fulcrum of the lever and in substantial alinement therewith when the door is in its closed position.

2. In combination with a hopper, a pivoted door controlling the discharge therefrom, a lever fulcrumed at one side of the hopper, a link pivotally connecting said lever and door, the pivotal points of said link being positioned on opposite sides of the fulcrum of the lever and in substantial alinement therewith when the door is in its closed position, and a weight acting on the lever to normally hold the door in its closed position.

3. In combination with a hopper, a pivoted door controlling the discharge therefrom, a lever fulcrumed at one side of the hopper, a link pivotally connecting said lever and door, the pivotal points of said link being positioned on opposite sides of the fulcrum of the lever and in substantial alinement therewith when the door is in its closed position, a weight acting on the lever to normally hold the door in its closed position, and means for actuating said lever to move the fulcrum thereof and the pivotal points of the link out of alinement.

4. In combination with a hopper, a pivoted door controlling the discharge therefrom, a lever fulcrumed at one side of the hopper, a link pivotally connecting said lever and door, the pivotal points of said link being positioned on opposite sides of the fulcrum of the lever and in substantial alinement therewith when the door is in its closed position, a weight acting on the lever to normally hold the door in its closed position, and means for limiting the movement of the lever.

5. In combination with a hopper, a pivoted door controlling the discharge therefrom, a lever fulcrumed at one side of the hopper, a link pivotally connecting said lever and door, the pivotal points of said link being positioned on opposite sides of the fulcrum of the lever and in substantial alinement therewith when the door is in its closed position a weight acting on the lever to normally hold the door in its closed position, and adjustable means for limiting the movement of the lever.

6. In combination with a hopper, having a discharge opening, a door pivoted at the top of the opening, levers pivoted at each side of the hopper, links normally lying along side of the levers and having pivotal connection with the levers at one end and connected to the lower end of the door at their opposite ends, and operating means having connection with the levers at their forward ends.

7. In combination with a hopper, having a discharge opening, a door at the upper end of the opening, means for actuating the door located at the sides of the hopper and having connection with the door, means pivoted at the sides of the hopper and having connection with the last named means for moving the same, and means for actuating said pivoted means.

In testimony whereof I have signed my name to this specification in the presence of two subscribing witnesses.

OSCAR W. SEVERSON.

Witnesses:
    JNO. GILLESPIE,
    C. A. OLSON.